(No Model.) 2 Sheets—Sheet 2.
L. H. NASH.
PROPORTIONAL WATER METER.
No. 353,700. Patented Dec. 7, 1886.
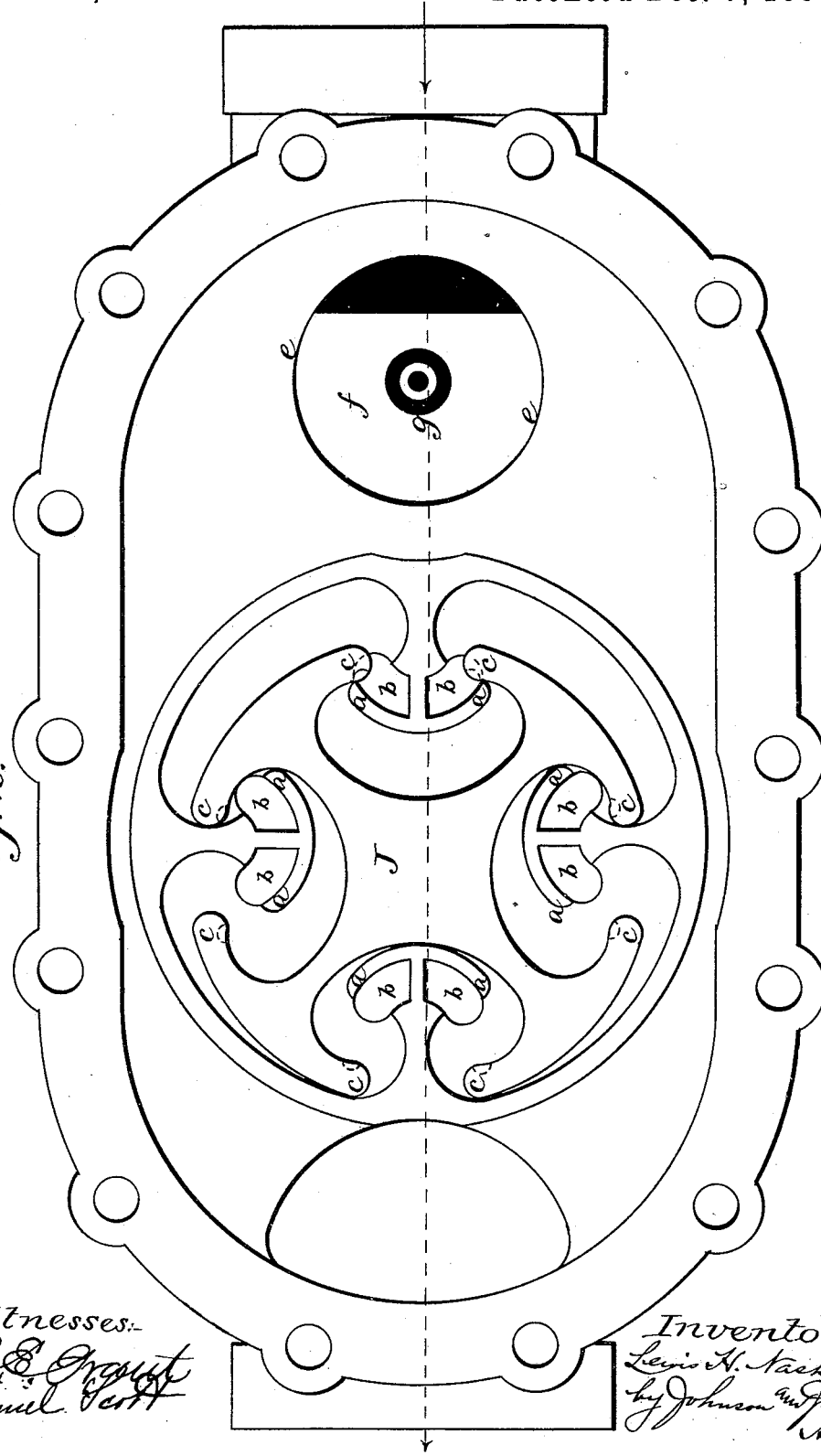
Fig. h.
Witnesses:
Inventor:
Lewis H. Nash
by Johnson and Johnson
Attys.

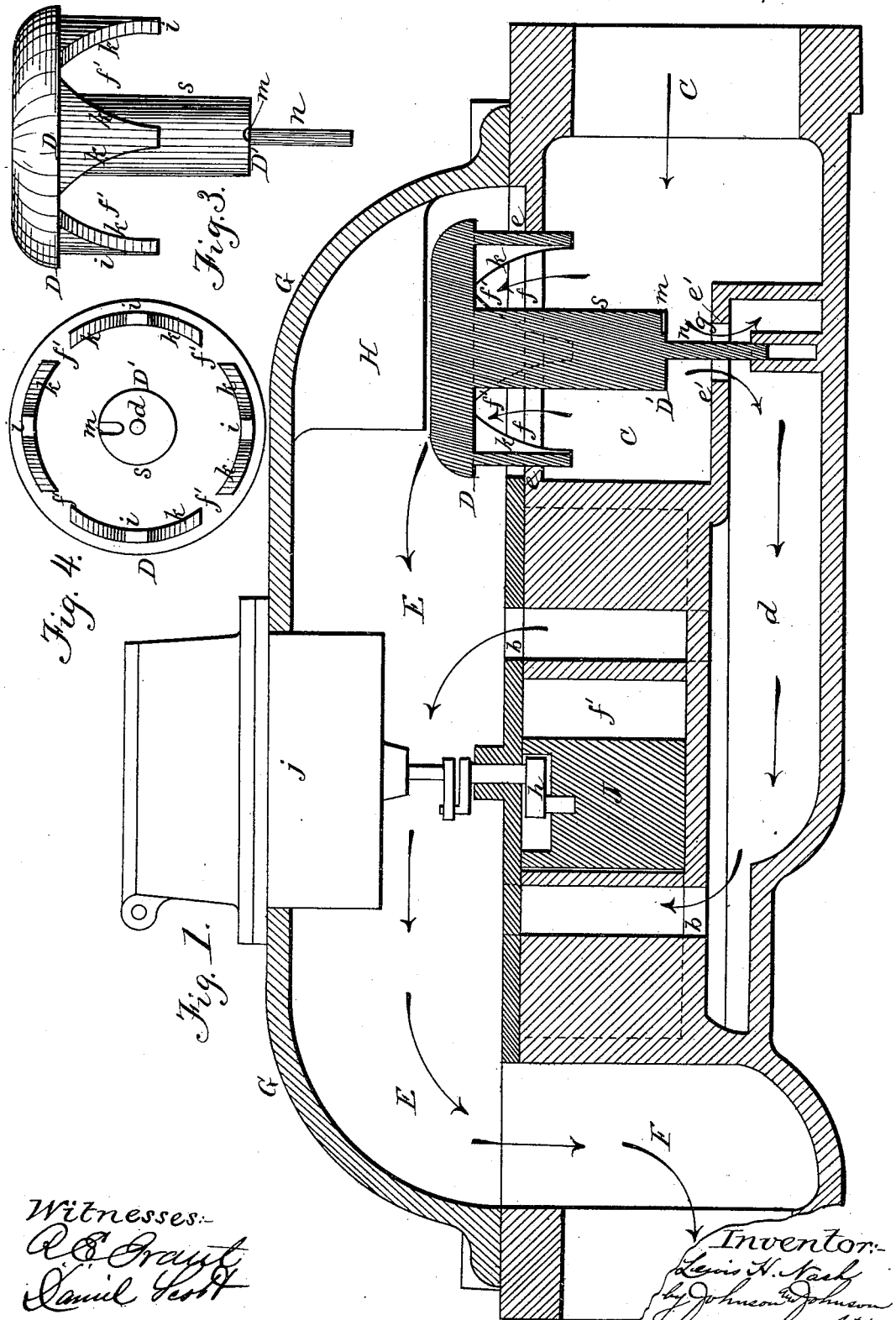

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 353,700, dated December 7, 1886.

Application filed January 16, 1886. Serial No. 188,772. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

For proportional water-meters in which the inflow is divided into two streams, one of which only is measured to give the sum of both streams, I have devised a weighted automatic flow-controlling double check-valve of unequal diameter, moving in guide-bearings at each end, the cylindrical walls for the larger coacting valve having ports of irregular outline, whereby the relative proportional areas of the discharge-ports may be varied, so as to pass a definite proportion of water under every rate of flow. As the coacting check-valves are lifted against the resistance of their weight, I provide a small perpetually-open channel for the discharge-port controlled by the valve of least diameter, whereby under small rates of flow the volume of water passing through the metered passage will be so increased as to give a very delicate and sensitive action to the registering device under small rates of flow without appreciable effect upon registration under large rates of flow. The coacting check-valves are formed with flat faces upon the opposite ends of a solid stem, so that both check-valves when closed rest upon horizontal seats of the ports. The guide-bearings for the valves are formed by a central stem passing through the lower port into a hollow step, and by a hollow circular rim on the face of the upper check-valve passing through the upper port, and this guide-rim has the openings of variable outline, which operates to pass a definite proportion of water for every rate of flow. The weight of the double check-valve is such that for any given rate of delivery of the meter the valve will be held in a definite position and will open the ports for each stream, so as to pass the required proportion of the flowing volume. The double check-valve is placed vertically at the inlet end of the meter, in bearings which offer little friction, and is closed by its weight and lifted by the pressure of the inflow against the acting face of the larger valve, its ascent being limited by a stop, so that it cannot be displaced from its bearings. The principle of varying the proportional areas of the discharge-orifices of a water-meter in which the influent volume is divided into two streams, one of which is measured to determine the measurement of both, in connection with the manner of determining such result, is set forth in applications for Letters Patent filed by me September 4, 1885, under Serial Nos. 176,159 and 176,160, and in pursuance whereof Letters Patent were issued under date February 16, 1886, numbered, respectively, 336,138 and 336,139, and November 30, 1885, under Serial Nos. 184,329 and 184,330, and in pursuance whereof Letters Patent numbered, respectively, 336,145 and 336,146 were issued under the same dates, and such matter is not broadly claimed herein.

In an application for a patent filed by me of even date herewith I have devised a hollow automatically-acting double-plunger cylindrical valve having discharge-ports formed to vary their proportional area for every rate of flow, and in which the form and capacity of the ports and the weight of the coacting valves are such that for any given rate of delivery of the meter the coacting valve will be held in definite position and will open the ports for each stream the proper area to pass the required proportion of the flowing volume.

My present improvement is therefore confined to a double valve acting like a flat check-valve to govern and to vary the ports, as contradistinguished from a valve acting like a plunger to govern and to vary its wall-ports.

Referring to the drawings, in Figure 1 I have shown in vertical section a water-meter having my improved proportional-flow-controlling double check-valve. Fig. 2 shows a top view with the case, cover, and valve removed to show the form of the revolving non-rotating piston which I prefer to use. Fig. 3 shows the double-seated check-valve in elevation, and Fig. 4 shows the under side of this valve.

For the meter-operating parts I prefer to use a revolving non-rotating piston, J, having bearing-points $c$, coacting with an equal number of case bearing-points, $a$, and with inlet and exhaust head-ports $b$, whereby the piston-points are caused to open communication between the measuring-spaces the instant communication is closed with the inlet to effect the free inlet and discharge of the water into and from the measuring-spaces, as described and shown in an application for a patent filed by me October 16, 1885, under Serial No. 180,083, and in pursuance whereof Letters Patent numbered 336,142 were issued under date of February 16, 1886. In this operation the piston is controlled by a crank-connection, $h$, with the case in such manner as to hold the piston in contact with the case-bearing surfaces at every point in its revolution, for the purpose of dividing the case-chamber into enlarging and contracting spaces. The crank $h$ has a fixed relation to the piston and to the case, and the piston is thereby forced to describe a circle which keeps its bearing-surfaces in contact with the bearing-surfaces of the case, and the outflow must necessarily be registered, as the indicating mechanism is connected to the crank and operated by the piston. I may, however, use the "Crown" meter piston-operating part, in which the piston itself revolves and forms the valve, as in my patents of January 21 and 28 of 1879; or any other meter-operating device may be used.

The inflow-controlling double check-valve is placed in the inlet-passage C, where the volume is divided; and F is the outlet-passage, where the divided streams meet after being measured. The valve is of the double check type, fitted in guide-bearings, so as to operate vertically, closing by its weight and opening by the pressure of the inflow.

The valve has two flat joint-forming faces, D and D', of unequal diameter, formed on a valve-stem, $s$, so as to operate ports $f$ and $g$, formed in the case-walls at the top and at the bottom of the valve.

The lower guide-bearing for the double check-valve is formed by a stem, $n$, projecting from its lower valve-face through the lower port and fitted in a socket rising from the bottom of the case, while the upper guide-bearing is formed by a cylindrical rim, $i$, projecting downward from the upper valve-face through the upper port and fitted to bear upon the port edges. The upper port, $f$, opens into the main discharge-passage E in the case above the meter-piston, and the bottom port, $g$, opens into the meter-passage $d$ below the piston. The ring-rim $i$ of the top valve is cut away to form openings $f'$, of irregular or curved outline, so that the areas of said openings diminish as they approach the joint-forming face of the valve. This outline is formed and determined by enlarging by filing away or contracting the edges $k$ until the opening is the required size to pass the right proportional quantity of water through the port.

The inlet-passage C extends all around the valve, and the pressure of the inflow is constantly exerted upon the face of the top valve to open it, so that one stream passes upward through the port-openings $f'$, formed by the guide-rim $i$, and the edge of the valve-seat $e$, while the other flows downward through the port $g$ in the valve-seat $e'$ of the meter-passage. The weight of the valve determines the pressure of the water as it issues through the valve-orifices, and such weight may be regulated to suit the delivery of the meter; hence if the meter is delivering a certain quantity of water the weighted coacting valves will be lifted just enough to open the ports $f$ and $g$ sufficiently to allow that amount of water to pass through said ports under the pressure caused by the weight of the valve, and the valve will therefore always stand in the same position when the meter is delivering the same quantity of water. It is this action of the valve in always assuming the same position when the same quantity of water is passing which enables it to exert the regulating effect upon the two streams for every rate of flow, and which makes the registration of the device reliable. Now, in order to control the proportional quantity of water which shall flow through the two streams for any given rate of flow, it is necessary that the areas of the port-openings should bear a definite proportion to each other; and this ratio of the two port-openings cannot be determined by calculation, since it will vary with every different construction of measuring device and connecting-passages. Therefore the proportional size of the port-openings $f$ is determined by actual test.

If the delivery of the meter increases, the valve will rise higher, and a new proportional relation between the areas of the port-openings will be determined for the new position of the valve, and this will be done for every rate of flow.

The outlet-chamber E is formed by the case-cover G, upon which the box $j$, containing the register-operating parts, is seated, and the cover has a projection, H, just over the flow-controlling valve to limit its lift. When the coacting valves are in their lowest position, they rest upon their joint-forming faces, closing the ports, so that the upper valve will be exposed to the lifting pressure of the water in the inlet-passage, and will lift and hold the valve open, so that the flow of the two streams will flow as indicated by the arrows.

In order that the meter may register very minute volumes of flow when the force of the water is so small as not to apparently lift the valve, I provide a small groove or channel, $m$, in the acting face of the smaller valve, which opens at the outer wall of the valve-stem, so as to extend over and communicate with the lower port when the valves are just slightly open, and thus allow the flow of a greater quantity of water through the metered passage until the meter registers correctly upon small rates of flow. This will have little or no effect upon the registration in the large rates of flow, which will be regulated by the means described.

I claim—

1. The combination, with a water-meter having the influent volume divided into two separate streams, one of which is measured, of a double-seated check-valve effecting the division of the flowing volumes, the upper valve part having wall-openings of irregular form and the lower valve part formed of the flat end of the valve-stem, whereby to regulate the proportional area of the discharge-port openings for the two streams for every rate of flow, substantially as described, for the purpose specified.

2. The combination, with a water-meter in which the inflow is divided into two streams, one of which is measured, of a case having two valve-ports of unequal diameters, with a weighted check-valve having a cylindrical guide part provided with discharge-port openings of a conformation adapted to regulate the relative proportional area of the two case-ports for every rate of flow, substantially as set forth.

3. The combination, with a water-meter case having the flow-passages C d E and the meter-operating device, of the connected check-valves of unequal diameters, the upper check-valve having ports of irregular outline, and a supplemental perpetually-open flow-channel for the lower valve-port, substantially as described, for the purpose specified.

4. The combination of a water-meter case having the valve-chamber C, provided with an upper and a lower discharge-passage, f g, opening into an upper and a lower discharge-passage, E d, and a suitable register-operating piston, with a weighted check-valve, D D', having an open cylindrical guide, i, formed with ports f', operating substantially as described.

5. The weighted check-valve having the joint-forming faces D D', the guide-stem n, and the guide-bearing i, formed with ports f', of irregular form, in combination with a meter-case having inflow dividing-passages f and g, and a suitable register-operating piston, substantially as described.

In testimony whereof I have hereunto set my hand in the presence of two subscribing witnesses.

LEWIS HALLOCK NASH.

Witnesses:
A. E. H. JOHNSON,
J. W. HAMILTON JOHNSON.